United States Patent [19]

Nixon

[11] 3,827,547
[45] Aug. 6, 1974

[54] GLASS SHEET CONVEYING APPARATUS
[75] Inventor: Phillip Sidney Nixon, Skelmersdale, England
[73] Assignee: Pilkington Brothers Limited, Lancashire, England
[22] Filed: Apr. 10, 1972
[21] Appl. No.: 242,418

[30] Foreign Application Priority Data
Apr. 16, 1971   Great Britain ...................... 9692/71

[52] U.S. Cl. ............. 198/127 R, 65/182 A, 198/131
[51] Int. Cl. ........................................... B65g 13/02
[58] Field of Search ............ 198/131, 127 R, 127 B; 65/182 A

[56] References Cited
UNITED STATES PATENTS
| 746,145 | 12/1903 | Perky ............................... 198/127 R |
| 3,485,616 | 12/1969 | Mitschke .......................... 65/182 A |
| 3,505,782 | 4/1970 | Nierderer......................... 198/131 X |
| 3,594,149 | 7/1971 | Pickavance et al................ 65/182 A |

FOREIGN PATENTS OR APPLICATIONS
53,242   4/1967   Poland ........................... 198/127 R Primary Examiner—Evon C. Blunk
Assistant Examiner—Douglas D. Watts
Attorney, Agent, or Firm—Burns, Doane, Swecker & Mathis

[57] ABSTRACT

Apparatus for conveying a succession of articles, such as glass sheets, by contact with an adjacent edge portion of each article, along a conveying path such as a gas hearth, comprises a plurality of elongated carriage members each carrying one or more drive-transmitting elements (e.g. transverse arms) for engaging edge portions of the articles, particularly of articles presenting indented or skewed edges, and a set of rotary drive elements conical discs on vertical spindles for propelling the carriage members by frictional engagement. The drive elements may be used without the carriage members for directly driving straight-edged articles. A roller conveyor with means for driving the carriage members frictionally alongside the conveyor rollers may precede the gas hearth.

6 Claims, 7 Drawing Figures

GLASS SHEET CONVEYING APPARATUS

BACKGROUND OF THE INVENTION

1. Field of the Invention

This invention relates to apparatus for conveying a succession of articles, for example, glass sheets.

2. Description of the Prior Art

When conveying glass sheets along a conveyor or over a gas hearth in which the sheets are supported on a gaseous cushion, it is known to drive the sheets, or at least to control their advance in the direction of movement by providing drive discs which engage an edge or edges of each sheet in turn and thereby at least assist movement of the sheets in said direction.

It is also known to engage each sheet by at least one drive transmitting element attached to an elongated carriage member extending parallel to the direction of movement and to apply a positive drive to the carriage member or members. The element or elements for each glass sheet may be attached to an endless chain which engages sprocket wheels driven by an electric motor.

More particularly, but not exclusively, the invention relates to the conveying of glass sheets through a bending process and, if desired, a toughening process, and also has special regard to the case in which the glass sheets being bent and possibly toughened cannot be conveyed with a straight edge extending parallel to the direction of movement of the sheets to maintain the desired positional relationship of the sheets with respect to the bending surface. For example, the glass sheets may be contoured or cut away along the edge which could otherwise be employed to engage edge drive discs, or it may be required to bend glass sheets at a skew with respect to any suitable straight edge.

SUMMARY OF THE INVENTION

According to the invention apparatus for conveying a succession of articles along a generally horizontal path by contact with an adjacent edge portion of each article, comprises a plurality of elongated carriage members disposed parallel to the conveying path and displaceable along one side of the path, each carriage member carrying a drive transmitting element adapted to engage an edge portion of an article to be conveyed, and a set of rotary drive elements spaced apart along the said side of the conveying path, each drive element having a surface arranged for frictional driving engagement with the carriage members successively and being arranged to be driven so as to propel the carriage members along the side of the conveying path.

Each carriage member may carry two of said drive-transmitting elements which are pivotally mounted thereon so as to be capable of extending transversely of the conveying path to engage respective edge portions of an article presenting an indented or skewed edge to the said side of the conveying path.

Preferably the carriage members and their drive-transmitting elements are removable and the apparatus comprises a set of rotary drive dics spaced apart along the said side of the conveying path, each of the drive discs being arranged to be driven and having a substantially vertical peripheral edge for making direct engagement with a straight edge of an article on the conveying path, so that on removal of the carriages the apparatus is adapted to propel such straight-edged articles along the conveying path by contact with the drive discs, with the straight edges extending parallel to the direction of movement. In this case, the rotary drive discs may be the rotary drive elements for propelling the carriage members, each drive disc having an upwardly facing conical surface for frictional driving engagement with the undersurface of the carriage members.

The drive discs are thus capable of carrying out the dual function of driving the carriages, for conveying articles with edges which are curved or which for other reasons cannot be brought into parallelism with the direction of movement, and of directly driving the articles where such articles do have straight edges which can be aligned with the direction of movement.

The conveying path may be constituted by a gas hearth on which the articles, such as glass sheets, are supported by gas jets.

The gas hearth may be preceded by a set of conveyor rollers spaced apart along the direction in which the article is to be conveyed, means being provided for driving the carriage members frictionally alongside said conveyor rollers. Preferably the carriage drive means comprise a carriage drive surface on each conveyor roller, for frictionally engaging the carriage members successively and thereby propelling the carriage members in said direction.

DESCRIPTION OF THE PREFERRED EMBODIMENT

Figure 1:
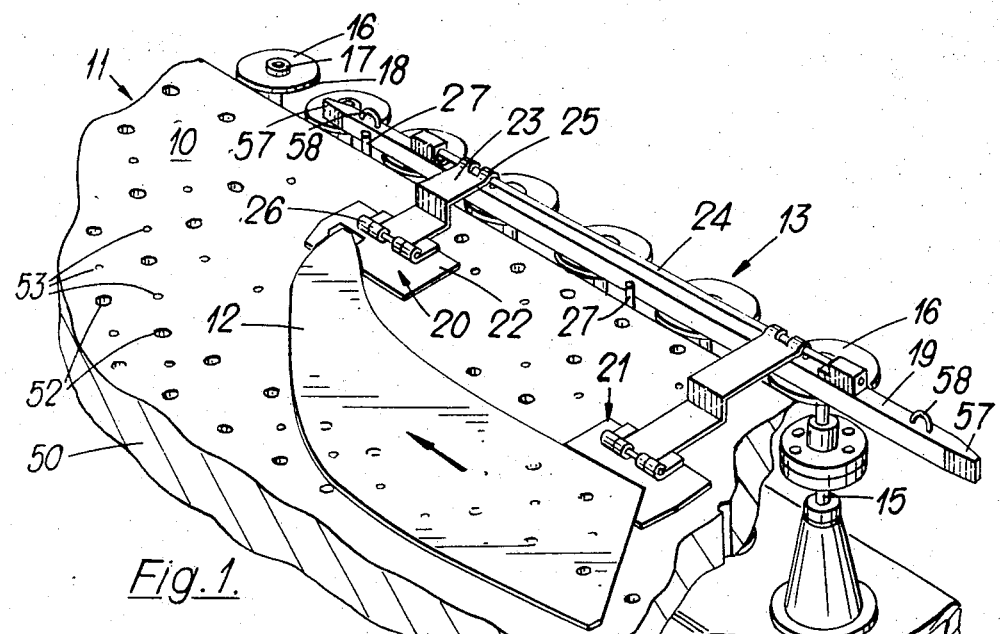
FIG. 1 is a perspective view of a glass sheet being conveyed by drive means along a gas hearth, the glass sheet having only an indented or curved edge extending in the general direction of movement.

FIG. 1 shows the upper surface 10 of a known form of gas hearth 11 along which glass sheets 12 may be conveyed whilst they are supported by a cushion of gas emitted through passages 52 in the upper surface of the hearth and exhausted through smaller passages 53. The apparatus may be used for bending and toughening the glass sheets whilst they are supported on and conveyed along the gas hearth, as described below.

This invention is not concerned with the construction of the gas hearth itself but only with the drive means provided for conveying a succession of glass sheets therealong. It should be explained, however, that the gas hearth comprises a succession of tiles 50 disposed above an exhaust chamber 51 and a plenum chamber (not shown) below. Gas passageways 52 lead from the plenum chamber to the upper surfaces of the tiles and exhaust passageways 53 extend between the upper surfaces 10 of the tiles and the exhaust chamber 51. The initial part of the gas hearth has a flat upper surface 10, in subsequent parts the upper surface is progressively contoured transversely so that the softened glass sheets will sag into a transversely curved shape determined by the contour of the gas hearth. The gas hearth is generally horizontal along its length but it may be canted slightly (e.g. by about 5°) to the side provided with the drive means so that the glass sheets tend to remain in contact with the latter under their own weight.

The drive means to be described are suitable for the conveyance both of straight-edged glass sheets and of shaped glass sheets during the bending and subsequent toughening operations. By shaped glass sheets is meant sheets which during bending can only present an indented or skewed edge to the drive means. The drive means comprise a set of drive discs 13 spaced apart along one side of the gas hearth in the direction of movement of the glass sheets. Each disc 13, is mounted on a spindle 15 for rotation about a vertical axis and is driven in a clockwise direction (as viewed in FIG. 1) through a gear box 14 by a drive motor (not shown). In the case of FIG. 1 there is a single gear box 14 comprising a longitudinally extending helical worm gear 55 which engages a worm wheel 56 attached to the lower end of each spindle 15. Alternatively the worm gear 55 may be replaced by a shaft carrying separate bevel gears mating with similar bevel gears on spindles 15. All the discs 13 are thereby driven at the same rotational speed. However, in practice, there will be a series of drive discs 13 along the full length of the gas hearth 11 and it may be desirable to provide several gear boxes 14, each of which is interconnected in driving relation with a plurality of spindles 15. If desired, the gear boxes 14 may be designed to drive certain of the drive discs 13 at different rotational speeds thereby permitting movement of the glass sheets at different translational speeds along respective portions of the gas hearth.

Each disc 13 has an upwardly facing surface 16 which tapers upwardly in the form of a cone towards a central collar 17. The angle of taper is about 5°. Each disc 13 also has a substantially vertical peripheral surface 18, which is perpendicular to the tangent to the adjacent surface of the gas hearth.

Resting on the upper surfaces 16 of at least some of the drive discs 13 in radial line contact with each disc, are a plurality of carriages 19 (only one of which is shown in FIG. 1), one carriage being provided for one or more glass sheets being conveyed. Each carriage 19 comprises a bar or tube of substantially square cross-section. Mounted on each carriage 19 is a pivot rod 24 extending longitudinally of the carriage and two drive transmitting elements, 20, 21 hinged to the rod for contact with opposite ends of the adjacent edge of the respective glass sheet 12. It will be seen that, in this example, the elements protrude to different distances from the carriage to suit the shape of the particular glass sheet shown.

Each element 20, 21 comprises a main plate 22 which is shaped to engage the sheet and a secondary plate 23 which is cranked and hinged at one end 25 to the rod 24 and at the other end 26 to main plate 22, both hinge axes being parallel to the direction of movement of the glass sheet. The main plate 22 of each element 20, 21 is thereby able to pivot with the glass sheet 12 about the axis of the hinge 26, with respect to the carriage 19, and remain tangential to the upper surface 10 of the gas hearth 11. This provision is important in a case such as this embodiment in which the gas hearth is one in which the upper surface is of changing contour along its length. Each element is also able to pivot, as a whole, about the axis of the hinge 25, i.e., the axis of the rod 24.

The particular distance which each element 20, 21 protrudes laterally from the carriage 19 and the particular edge contour of the main plate 22 are determined in each case by the shape of the glass sheet being conveyed and the precise angular relationship in which the sheet must be maintained, with respect to the contoured surface 10, so as to impart the desired bend to the sheet.

Rotation of the drive discs 13 by the gear box or boxes 14 will transmit a frictional drive to the carriages 19 and thereby, by means of the drive transmitting element 20, 21, cause the glass sheets to be conveyed along the gas hearth 11. Resting the carriages 19 on the drive discs 13 has the advantage that the carriages 19 can be disposed as near as possible to the adjacent edge of the gas hearth, and accordingly as close as possible to the glass sheets 12. Also, the provision of drive discs having cone-shaped upper surfaces 16 has the advantage that the directional velocity of the discs along the radial line of contact between the discs and the carriages will match the forward direction of the carriages and thereby minimise any tendency for the carriages to be moved sideways.

In the case of all the drive discs 13 being at precisely the same height, the radial line of contact between the carriage 19 and each disc will be along a line which is normal to the direction of movement, so that the driving force applied by the discs to the carriage will be strictly aligned with the direction of movement. However, in the case of a slightly downwardly sloping path for the edges of the glass sheets 12 and hence the carriages 19 (whilst the glass sheets are adapting themselves to the increasing contour of the gas hearth), said line of contact is slightly beyond the line which is normal to the direction of movement and thus, if one considers the line of contact as extending from the centre of the disc outwards, the line of contact is inclined slightly forwards in relation to the direction of movement. As a result the rotation of the discs applies a small lateral force on the carriage in a direction towards the central collars 17 of the discs 13 which force increases the driving effect. Similarly, in the case of a slight levelling out of the path for the carriages 19, at the transition from the region in which the transverse curvature of the gas hearth is increasing to a following region in which it is constant, said line of contact is slightly before the line which is normal to the direction of movement and thus the rotation of the discs applies a small lateral force to the carriage in a direction away from the discs which force tends to push the carriages off the drive discs 13. To counteract this latter tendency, stainless steel pegs 27 are provided between adjacent drive discs on the same side as the gas hearth. These pegs are only strictly necessary for the transition region of the gas hearth between the bending section of increasing transverse curvature and the constant curve section, but, in practice, they are used along the full length of the gas hearth.

To ensure that the carriage members 19 pass between the pillars 27 and the central collars 17 of the discs 13, the leading end of each carriage member is tapered at 57 to provide a lead-in therefor.

Also, to facilitate removal of the carriage members, each member is provided with eyes or loops 58.

Figure 2:
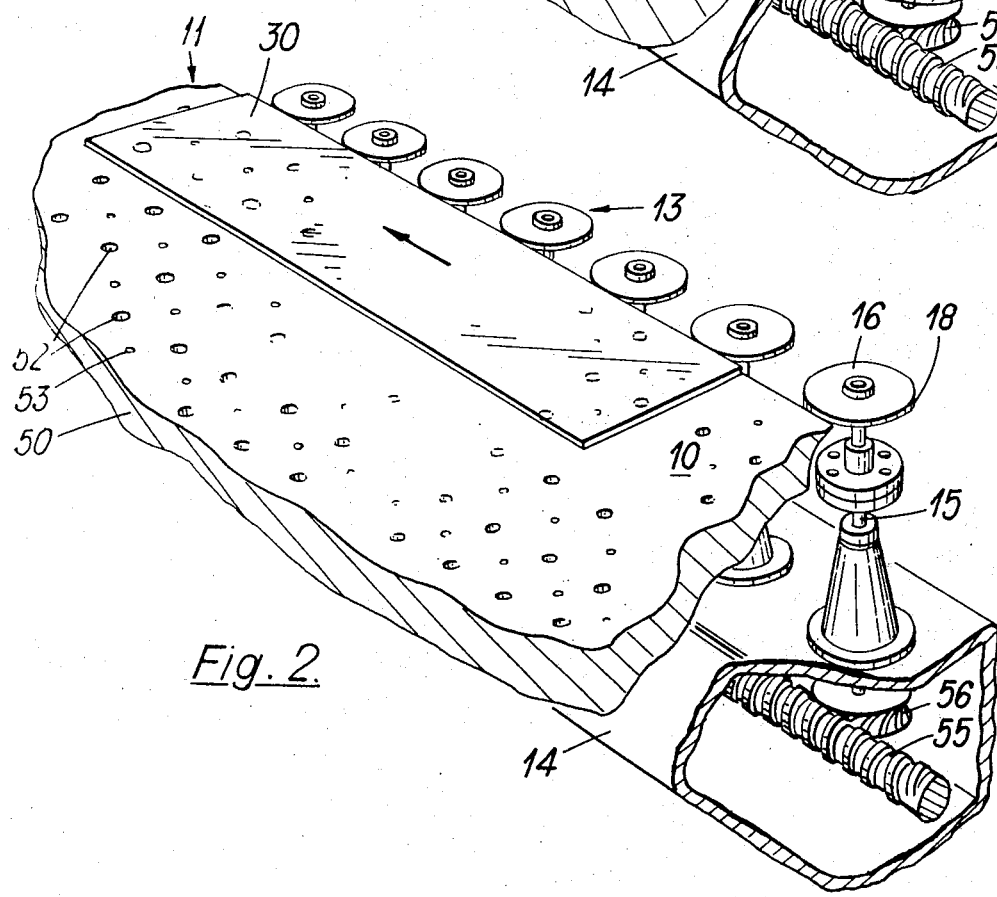
FIG. 2 is a perspective view of the same apparatus as shown in FIG. 1, but with the carriage members removed, in use for conveying a glass sheet having a straight edge extending parallel to the direction of movement.

With regard to FIG. 2, there is shown a glass sheet 30 being conveyed directly by the drive discs 13 above the upper surface 10 of the gas hearth 11, the glass sheet 30 having a straight edge extending parallel to the direction of movement of the glass sheets and therefore, unlike the sheets 12 shown in FIG. 1, capable of lying adjacent to and in frictional driving engagement with the above-mentioned substantially vertical peripheral surfaces 18 of the drive discs.

It will thus be appreciated that the apparatus described above is suitable for conveying either glass sheets 30 having a straight edge which is parallel to the direction of movement (as in FIG. 2) or, by means of the carriages 19 and the upwardly facing tapered surfaces 16 of the drive discs 13, other glass sheets 12 which do not fulfill this requirement, which alternative or dual purpose arrangement is of considerable practical advantage.

Also, the fact that the drive to the carriage members is a frictional drive is advantageous since in the event of an unexpected build up of glass sheets being processed, succeeding carriage members and glass sheets will not be forced to proceed through the apparatus, as would be the case in a positive drive arrangement.

FIGS. 3 to 6 relate to a system of manufacturing curved, toughened glass sheets, e.g. vehicle doorlights, ventilators etc, employing a gas hearth. In this system, a succession of flat glass sheets are heated to a temperature near the softening point of the glass, and then passed along a section of the gas hearth floatation bed which is progressively contoured to the desired curvature of the glass whereby each glass sheet sags into conformity with the curvature. Finally the hot curved glass sheet passes into a quenching section where there is induced into the glass the desired stress by the application of a cold gas. The initial heating stage is, in this example, performed whilst the glass sheets are supported initially on horizontal rollers and then on the gas hearth.

Figure 3:
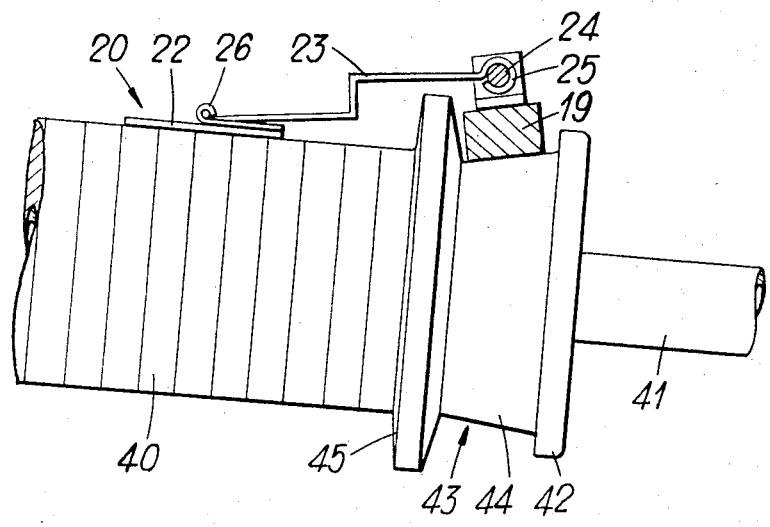
FIG. 3 is a partial elevational view of a conveyor roller preceding the gas hearth of FIGS. 1 and 2.

FIG. 3 relates to an initial pre-heating of the flat glass sheets up to, for example, 550° C. During this preheating the glass sheets are conveyed on a flat roller conveyor made up of asbestos covered rollers. FIG. 3 shows one of the rollers 40 of the roller conveyor and the leading end of a carriage 19 resting thereon. The rollers 40 are disposed upstream of the gas hearth by which the glass sheets are heated further to a temperature near the softening point of the glass, become curved and are subsequently toughened.

Each roller 40 is mounted on a shaft 41, the shafts being coupled together and driven by an electric motor.

Figure 4:
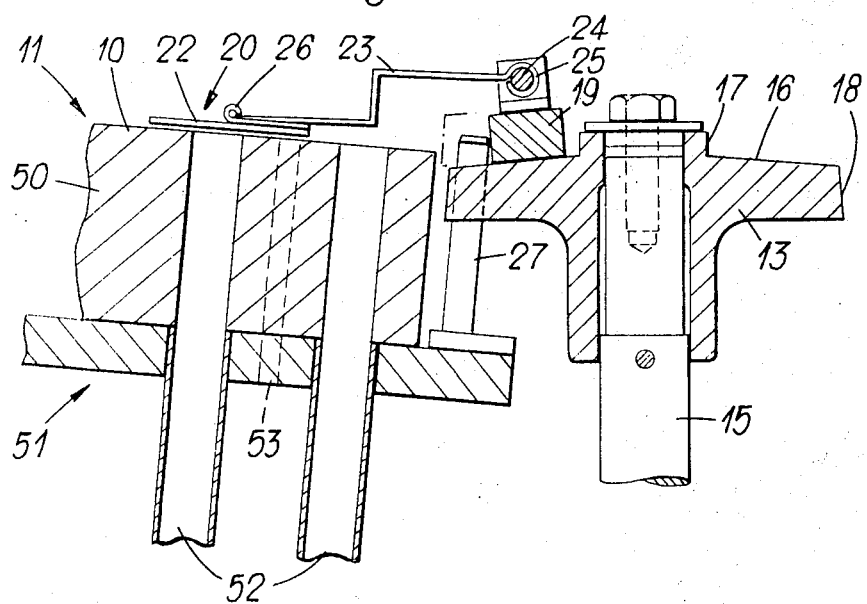
FIGS. 4 to 6 relate to successive treatment zones of the gas hearth through which zones the glass sheets can be conveyed by apparatus in accordance with the invention, each figure comprising a part section through the apparatus transverse to the direction of movement of the glass sheets.

The shaft 41 may be inclined at about 5° to the horizontal, as shown, to match the similar canting of the gas hearth (see FIG. 4). At the end of the roller 40 which is aligned with the driving side of the gas hearth, the roller has a collar 42 which forms an equivalent drive means to one of the drive discs 13 described above and illustrated in FIGS. 1 and 2. More particularly, the collar 42 has a peripheral groove 43 having a base 44 which is tapered at 10° to the axis of the roller 40 and diverges outwardly away from the roller. This base 44 provides a frictional carriage drive surface for making frictional drive engagement with the under-surface of each carriage 19. Owing to the 5° inclination of the roller shaft 41, the line of contact between the base 44 and the under-surface of the carriage 19 is inclined at 5° to the horizontal and can be in the same plane as the lines of contact between the cone surfaces of the first drive discs 13 and the carriages 19. Thus a smooth transfer of the carriages conveyor roller to conical disc is accomplished.

The collar 42 also has a surface 45 substantially normal to the shaft 41 and equivalent to the surface 18 of each drive disc 13, so as to be capable of applying a direct positional restraint to a glass sheet 30 having an adjacent straight edge extending parallel to the direction of movement (See FIG. 2). At this stage, the glass sheet 30 itself is driven primarily by surface contact with the asbestos covered rollers 40.

In FIG. 3, there is shown a carriage 19 resting on the base 44 of the collar groove 43, the carriage having the same two drive transmitting elements 20, 21 as shown in FIG. 1 for conveying, or at least during this preheat stage, constraining the movement of a glass sheet 12 (not shown in FIG. 3) having an adjacent indented or skewed edge over the rollers 40. The mean diameter of the groove base 44 of the collar is the same as the diameter of the roller 40, as that the linear speed of the carriages 19 is to the speed of movement of the glass sheet 12 over the rollers 40.

After the glass sheets 12 have passed over the rollers 40 of the roller conveyor, the sheets are conveyed on to the gas hearth 11, whereon at first the sheets are further heated to a temperature near the softening point of the glass. The initial part of the gas hearth has a flat upper surface 10 canted towards the side where the drive means are situated and a transverse section through this portion of the apparatus is shown in FIG. 4.

Figure 5:
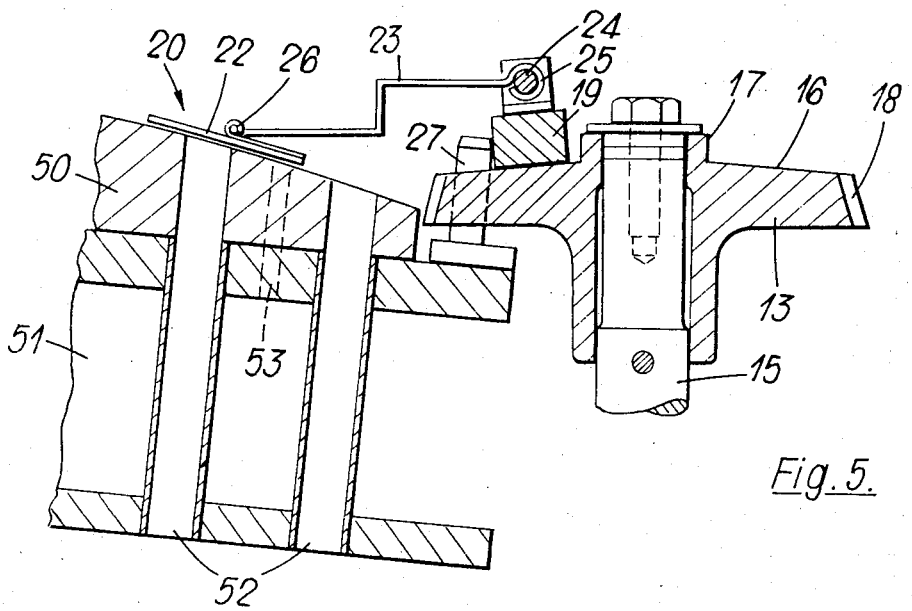
Figure 6:
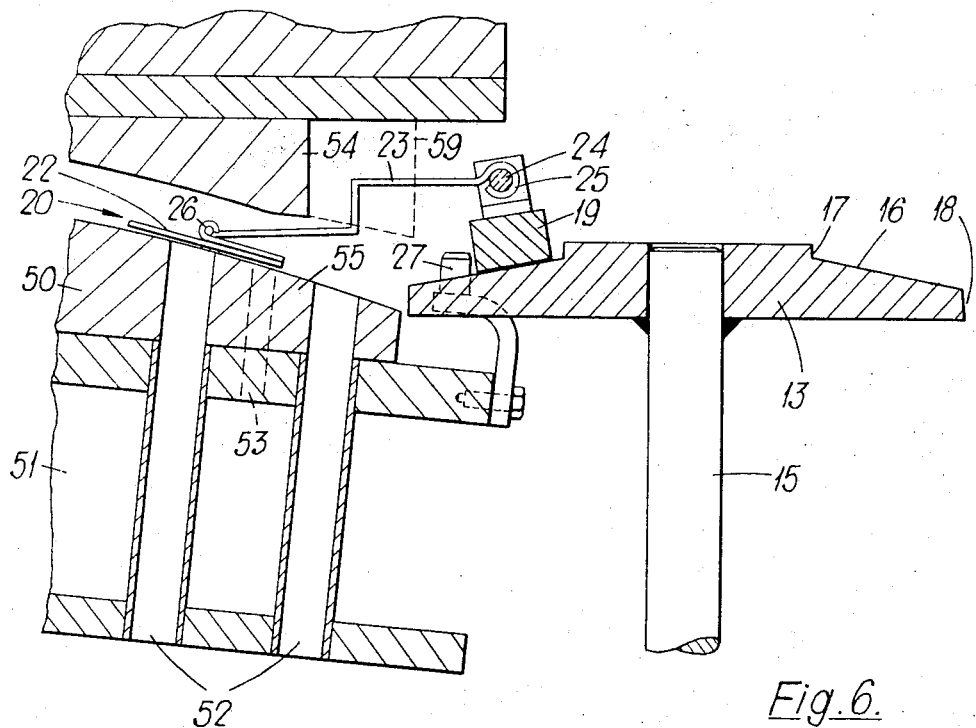

The drive means for the glass sheets 12 comprises the drive discs 13, carriages 19 and drive transmitting elements 20, 21 described above with reference to FIG. 1. Indeed, these drive discs extend along the full length of the gas hearth 11 throughout the downstream bending and quenching sections of which transverse section are shown in FIGS. 5 and 6 respectively. Although the drive discs along the length of the gas hearth are substantially the same, there are minor differences which will now be described.

In FIG. 4, the drive disc 13 is mounted on a spindle 15 which is movable vertically to adjust the height of the disc between an upper position (shown in dash lines) and a lower position shown in full lines. When the disc is in it upper position it extends upwardly above the upper surface 10 of the gas hearth 11 and is in a position suitable for driving glass sheets of the type 30, i.e., the sheets of FIG. 2. However, when the disc is in its lower position it is slightly below the upper surface of the gas hearth in a position suitable for driving glass sheets of the type 12, i.e., the sheets of FIG. 1, through carriages 19.

The reason for this vertical adjustment of the drive discs 13 will now be explained. As stated above, the roller conveyor on which the glass sheets are preheated is flat. Also the centre of the undersurface of the carriage is at the same level as the general plane of the roller conveyor. Hence when the glass sheets are transferred on to the gas hearth, the carriages 19 at least initially have to remain at the same height and this height must coincide with the upwardly facing, tapered conical surfaces 16 of the respective drive discs 13 on which the carriages rest. The drive discs must thus initially be mounted at a lower level in relation to the edge of the gas hearth than is required when the discs are to make edge contact with the glass sheets being conveyed. The number of discs which have to be mounted at the lower level depends on the rate at which the transverse curvature of the gas hearth increases along its length, as this curvature brings the edges of the gas hearth towards the same level.

As the sheets progress along the gas hearth, the level and contour of the gas hearth is thus changed gradually and so is the level of the subsequent drive discs 13. Hence in FIGS. 5 and 6, the drive discs 13 are at a higher level relatively to the adjacent edge of the gas hearth and consequently do not have to be adjusted in height to adapt them for the conveying of glass sheets 30 or glass sheets 12. Moroever, the line followed by the drive discs allows for sagging of the glass sheets as they are subsequently formed to their final curvature, without having to incline the member 23 at any greater angle.

During the final bending of the glass sheets 12 to their desired curvature at the region illustrated in FIG. 5, the drive transmitting elements 20, 21 pivot only slightly about the axes of their respective hinges 26 to follow the downwardly sagging lower edge of the glass sheet. There is consequently no need to allow for vertical adjustment of the discs 13 at this stage, and the discs are positioned so that they are suitable for effecting a frictional drive to either type of glass sheet 12 or 30. Also, throughout the whole length of the bending apparatus, any change or height from one drive disc 13 to the adjacent discs, either in an upward or downward direction, is gradual and does not affect the smooth passage of the carriages 19 and the glass sheets 12.

FIG. 6 relates to the quenching and toughening section in which the glass sheets are passed between upper and lower quenching boxes 54, 55, from which jets of cold gas are emitted, the lower quenching box being provided by a continuation of the gas hearth. Once again, the drive discs 13 are at a fixed height depending on the gas hearth radius, and in fact are welded to their respective drive spindles 15 at this section. As shown, it is necessary to cut back the outer part of the upper quenching box when treating glass sheets 12 to leave room for the cranked arms 23. This effect is achieved by providing a removable outer section 59 of quenching box 54 which can be inserted, as shown in dash lines, before the treatment of straight edged glass sheets.

As explained above with regard to FIG. 3, it is important that the drive speed of the rollers 40 matches precisely the speed at which the carriages 19 are driven by collars 42. Once the glass sheets are being conveyed over the gas hearth then the carriages 19 transmit the drive to the glass sheets. However, when bending and then subsequently toughening glass sheets, it is to be appreciated that the speed of movement of the sheets into the quenching stage must be much faster than that which is necessary during the previous bending stage, in order to avoid distortion or dimpling of the hot glass surface by impingement of the jets of cold gas thereon. An advantage of the arrangement described above is that the bending of the glass sheets may be achieved at a slower speed than is employed during passage of the sheets into the quenching and toughening stage simply by driving the discs 13 associated with the quenching and toughening stage (FIG. 6) faster than the discs 13 associated with the bending stage (FIGS. 4 and 5). This feature would not be possible if the drive transmitting elements were attached to a single chain drive, and consequently the gas hearth may be shorter than would be the case where the glass sheets are conveyed at the faster speed of the quenching and toughening stage, throughout the preceding bending stage. Moreover, the frictional drive of this invention ensures a smooth acceleration, or deceleration if desired, between stages run at different speeds.

Figure 7:
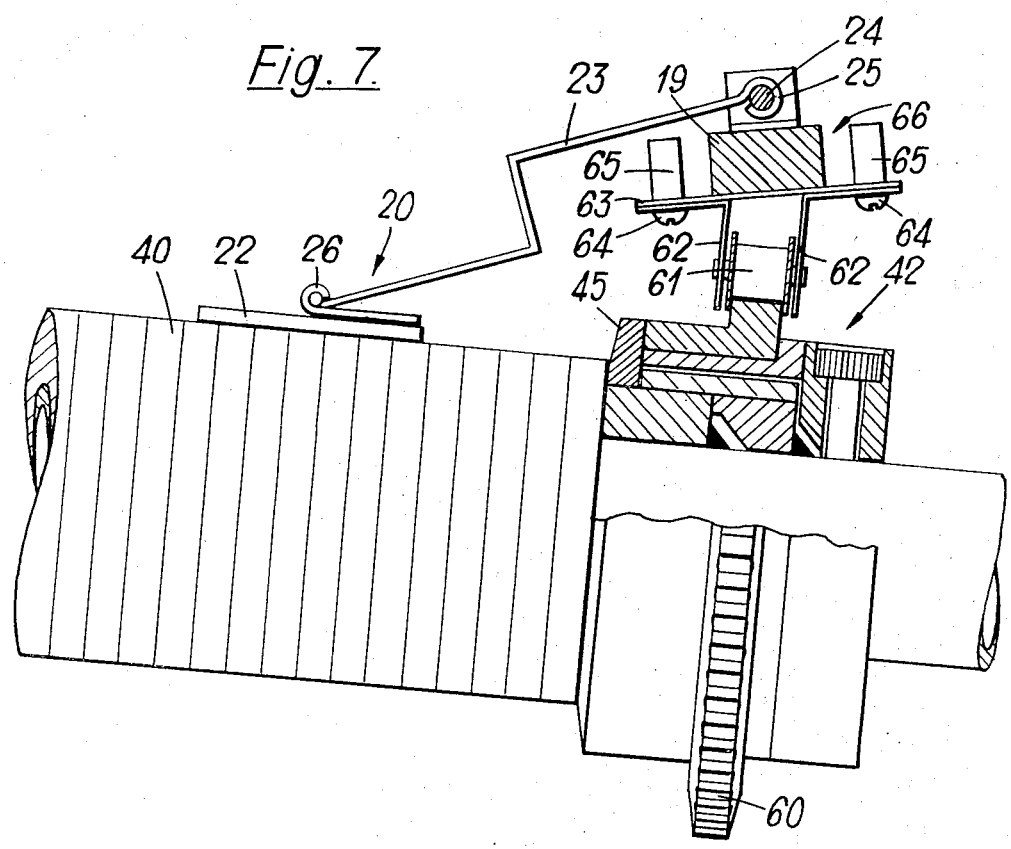
FIG. 7 is a view similar to FIG. 3 of an alternative construction of conveyor roller and associated carriage drive means.

FIG. 7 shows an alternative arrangement for positionally constraining the glass sheets during their movement over the rollers 40 of the roller conveyor, i.e., during the preheating of the glass sheets.

At least one, and preferably each of the rollers still has a collar 42 having a surface 45 substantially normal to the roller shaft 41 for making frictional engagement with a glass sheet 30 having an adjacent straight edge extending parallel to the direction of movement.

However, in this embodiment, a chain sprocket 60 is rotatably mounted on the collar 42. The teeth of the sprocket 60 engage the underside of the upper run of an endless roller chain 61 extending along the length of the roller conveyor. This roller chain 61 carries pairs of upwardly extending brackets 62 which are connected together by bridge plates 63 attached to the respective brackets by bolts 64 which are threaded into upstanding posts 65. The bridge plates 63 and posts 65 thereby form a channel 66 for reception of the carriage members 19 during the conveyance of glass sheets 12 which during bending can only present an indented or skewed edge to the drive means. The bridge plates 63 are inclined at 5° to the horizontal. At the end of the roller conveyor, the carriages 19 are driven successively by the drive discs 13 shown in FIGS. 4 to 6.

In this alternative embodiment, the carriages 19 are supported at a higher level than in the previous embodiment illustrated in FIG. 3. This has the advantage that the succeeding drive discs 13 (FIG. 4) may be mounted at a higher level in relation to the edges of the gas hearth 11, and thus need not be capable of vertical adjustment between using the apparatus for conveying glass sheets 12 (FIG. 1) and glass sheets 30 (FIG. 2). This results in quicker changeovers.

It is, however, necessary to ensure that the speed of the chain 61, and hence the speed of the carriage support constituted by elements 62 and 65 is equal to the peripheral speed of the rollers 40. For this purpose, the chain 61, is driven by means (not shown) preferably including a variable speed gearing so as to allow the drive to the glass sheets 12, over this initial roller section, to be synchronised accurately with the surface speed of the rollers 40. This is advantageous should the asbestos covered rollers 40 become worn down on long production runs, so that their surface speed is reduced.

The invention is not limited to conveying glass sheets, but may be applied to conveying other articles, particularly those which it is desired to convey in a special relationship with respect to a surface and which do not have a straight edge which is parallel to the direction of movement.

We claim:

1. Apparatus for conveying generally horizontally disposed glass sheets along a generally horizontally oriented conveying path, said glass sheets being of a first type wherein an edge portion thereof is oriented in a direction parallel to the conveying path and being of a second type wherein an edge portion thereof is disposed in non-parallel relation to the conveying path; said apparatus comprising:

glass support means for supporting the lower faces of said glass sheets and defining said generally horizontal conveying path;

a plurality of rotary drive discs disposed in longitudinally spaced relationship along one side of said glass support means, each of said drive discs being mounted for rotation about a substantially vertical axis of rotation and including:

a substantially vertical peripheral edge portion for directly conveying said first type of glass sheets having straight edges disposed along said one side of said glass support means and parallel to the conveying path;

said vertical peripheral edge portion being operable to make direct frictional driving engagement with said straight edges of said glass sheets; and an upwardly facing conical surface for conveying said second type of glass sheets having edges disposed along said one side of said glass support means and in non-parallel relation to the conveying path;

means for rotating said drive discs about said vertical axes to rotate said vertical edge portions and said conical surfaces;

means for transmitting drive forces from said conical surfaces of said drive discs to said second type of glass sheets comprising:

a plurality of carriage members being seated on said conical surfaces of a plurality of said drive discs and being oriented substantially parallel to said conveying path;

said carriage members being arranged to be driven by frictional engagement between said drive discs and the undersides of said carriages so as to be displaced in a direction generally parallel to the conveying path;

at least two longitudinally spaced arms pivotally attached to each carriage member and extending outwardly therefrom toward a respective one of said second type of glass sheets, each of said arms including:

an inner arm portion freely pivotally attached to said carriage member for rotation about an axis extending generally parallel to said conveying path, and an outer arm portion having glass-contacting edges for drivingly engaging its associated glass sheet and conveying said glass sheet along said conveying path;

said carriage members being removably seated on said conical surfaces such that removal of said carriage members and their drive-transmitting elements from said drive discs exposes said vertical peripheral edges for direct driving engagement with said first type of glass sheets.

2. Apparatus according to claim 1 wherein said glass support means defines a conveying path of varying contour; said outer arm portion being pivotally mounted to said inner arm portion for rotation about an axis extending generally parallel to the path of conveyance; the arrangement being such that said inner arm portion is free to rotate in response to a change in the vertical level of a point on said glass sheet contacted by said outer arm portion relative to the vertical level of the carriage, and said outer arm portion being free to rotate in response to a change in contour of said conveying path.

3. Apparatus according to claim 1 including pillars disposed between adjacent drive discs to resist lateral displacement of the carriage members from the drive discs.

4. Apparatus according to claim 1, wherein said conical surface of each said drive disc is tapered at about 5° to the horizontal.

5. Apparatus according to claim 1, wherein at least some of the drive discs are mounted for adjustment in a vertical direction relative to said support means.

6. Apparatus according to claim 1, wherein the rotary drive elements are divided into at least two sets of elements along the length of the conveying path, means being provided for driving one of said sets of drive elements at a different speed from the other or another of said sets of drive elements for accelerating or decelerating articles being conveyed.

* * * * *